United States Patent
Mellor et al.

(10) Patent No.: US 12,447,075 B2
(45) Date of Patent: Oct. 21, 2025

(54) CONTAINER FOR TRANSPORT OF A MOBILITY DEVICE

(71) Applicant: The Boeing Company, Arlington, VA (US)

(72) Inventors: Mitchell Loren Ray Mellor, Bothell, WA (US); Douglas Alan Brown, Edmonds, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/453,385

(22) Filed: Aug. 22, 2023

(65) Prior Publication Data

US 2025/0064653 A1    Feb. 27, 2025

(51) Int. Cl.
*B64D 9/00*    (2006.01)
*A61G 3/08*    (2006.01)

(52) U.S. Cl.
CPC .......... *A61G 3/0808* (2013.01); *B64D 9/003* (2013.01); *B64D 2009/006* (2013.01)

(58) Field of Classification Search
CPC ....... A61G 3/0808; A61G 3/0209; B64D 9/00
See application file for complete search history.

(56) References Cited

U.S. PATENT DOCUMENTS

| | | | | |
|---|---|---|---|---|
| 3,643,993 A | * | 2/1972 | Asadurian | B65F 1/122 220/628 |
| 5,890,612 A | * | 4/1999 | Coppi | B65D 88/14 220/531 |
| 5,941,405 A | * | 8/1999 | Scales | B65D 88/522 220/4.28 |
| 5,964,065 A | * | 10/1999 | Migurski | E04H 3/08 52/79.5 |
| 6,213,053 B1 | * | 4/2001 | Lammers | A01K 5/0107 119/51.01 |

(Continued)

FOREIGN PATENT DOCUMENTS

| | | |
|---|---|---|
| CN | 212660265 U | 3/2021 |
| DE | 102011000819 A1 | 8/2012 |

(Continued)

OTHER PUBLICATIONS

Vijay, R., et al., "A Heterogeneous PLC with BLE Mesh network for Reliable and Real-time Smart Cargo Monitoring", 2019 IEEE International Symposium on Power Line Communications and its Applications (ISPLC), Jan. 1, 2019, pp. 1-7.

(Continued)

*Primary Examiner* — Brian M O'Hara
(74) *Attorney, Agent, or Firm* — COATS & BENNETT, PLLC

(57) ABSTRACT

A container to contain a mobility device during transport on a vehicle. The container has a first side, a second side, and a wheel side. Wheels are connected to the wheel side. The container is selectively positionable between an upright orientation and a side orientation. The upright orientation positions the first side downward to contact a support surface and with the wheels spaced away from support surface. The side orientation comprises the first wheel side positioned downward towards the support surface and with the first side and the second side spaced away from the support surface.

18 Claims, 8 Drawing Sheets

(56) References Cited

U.S. PATENT DOCUMENTS

| | | |
|---|---|---|
| 6,616,103 B2 * | 9/2003 | Marrero .................. B64F 1/324 |
| | | 244/137.1 |
| 6,965,816 B2 | 11/2005 | Walker |
| 7,198,227 B2 | 4/2007 | Olin et al. |
| 7,324,921 B2 | 1/2008 | Sugahara et al. |
| 7,609,159 B2 | 10/2009 | Benson et al. |
| 7,714,708 B2 | 5/2010 | Brackmann et al. |
| 8,279,067 B2 | 10/2012 | Berger et al. |
| 8,515,656 B2 | 8/2013 | Reed et al. |
| 8,622,298 B2 | 1/2014 | Huber |
| 8,842,041 B1 | 9/2014 | Meyers |
| 9,162,765 B2 | 10/2015 | Huber |
| 9,323,967 B2 | 4/2016 | Choi et al. |
| 9,576,166 B2 | 2/2017 | Burch, V et al. |
| 9,904,902 B2 | 2/2018 | Skaaksrud |
| 10,005,564 B1 | 6/2018 | Bhatia et al. |
| 10,139,265 B2 | 11/2018 | Fuss et al. |
| 10,219,531 B2 | 3/2019 | Minvielle |
| 10,302,478 B1 | 5/2019 | Bennett et al. |
| 10,636,312 B2 | 4/2020 | Donhoffner et al. |
| 10,667,886 B2 | 6/2020 | Meadow |
| 10,878,364 B2 | 12/2020 | Burch, V et al. |
| 10,929,811 B2 | 2/2021 | Cole et al. |
| 11,080,643 B2 | 8/2021 | Ehrman et al. |
| 11,100,194 B2 | 8/2021 | Gao et al. |
| 11,142,342 B2 | 10/2021 | Podnar et al. |
| 12,184,097 B2 * | 12/2024 | Kroes ..................... H02J 3/32 |
| 2006/0164239 A1 | 7/2006 | Loda |
| 2009/0314673 A1 * | 12/2009 | Richins .................. B65D 25/54 |
| | | 206/335 |
| 2010/0102934 A1 | 4/2010 | Guichard |
| 2012/0057022 A1 | 3/2012 | Nechiporenko et al. |
| 2012/0275485 A1 | 11/2012 | Holzner et al. |
| 2013/0159205 A1 | 6/2013 | Schnörwangen et al. |
| 2016/0117536 A1 | 4/2016 | Johnsen |
| 2020/0137360 A1 | 4/2020 | Somers et al. |

FOREIGN PATENT DOCUMENTS

| | | |
|---|---|---|
| DE | 202012004864 U1 | 12/2012 |
| WO | 2005093627 A1 | 10/2005 |
| WO | 2021101961 A1 | 5/2021 |

OTHER PUBLICATIONS

Radio Bridge, "Wireless Sensors for the IoT", Retrieved from the internet: URL: https://radiobridge.com/blog/wireless-sensors-for-iot#:~:text=A wireless sensor is a,electrical signals%2C for further processing. [retrieved on Jun. 7, 2022]; pp. 1-8.

\* cited by examiner

CONTAINER FOR TRANSPORT OF A MOBILITY DEVICE

TECHNOLOGICAL FIELD

The present disclosure relates generally to the field of cargo containers and more specifically to a container configured to transport a mobility device.

BACKGROUND

Vehicles such as but not limited to aircraft, watercraft, and freight trailers for trains and trucks, are configured to store cargo during transport. For example, a commercial aircraft includes a cabin area for transporting passengers and a separate cargo hold. The cargo hold is separate from the cabin area and separate doors lead into the two spaces.

It is sometimes necessary to load specialized cargo for a passenger that is traveling on the vehicle. For example, the specialized cargo can include a motorized wheelchair of a traveling passenger. The size and/or configuration of the specialized cargo can make it difficult to load and store on the vehicle. For example, one or more of the dimensions of a motorized wheelchair are larger than the dimensions of a door that leads into a cargo hold. This prevents the motorized wheelchair from being loaded into the cargo hold while in an upright orientation. The motorized wheelchair is positioned on its side so it can be inserted through the door of the cargo hold. Once inside, the motorized wheelchair is either stored while on its side or rotated back and stored in the upright orientation. The large dimensions and the required handling can lead to damaging the motorized wheelchair. Further, it is difficult for personnel handling the cargo to lift and move the motorized wheelchair. This can lead to injury or require a larger workforce that can slow the process and increase the cost.

Another issue is positioning the motorized wheelchair in the cargo hold during transport. The dimensions of the motorized wheelchair can make it difficult to efficiently load the cargo hold. The low efficiency means less cargo is shipped on the vehicle thus potentially reducing the profitability of the vehicle. Further, the motorized wheelchair may be stored with bulk cargo. This can result in the other cargo contacting against the motorized wheelchair and potentially causing damage.

SUMMARY

One aspect is directed to a container to contain a mobility device during transport on a vehicle. The container comprises a first side, a second side, a wheel side, and one or more additional sides. The wheel side and the one or more additional sides extend between the first side and the second side. Wheels are connected to the wheel side. Wherein the container is selectively positionable between an upright orientation and a side orientation. Wherein the upright orientation comprises the first side positioned downward to contact a support surface and with the wheels positioned along the wheel side and away from support surface. Wherein the side orientation comprises the wheel side positioned downward towards the support surface and with the first side and the second side facing away from the support surface.

In another aspect, the wheels are aligned in a first row that extends along a first edge of the wheel side and a second row that extends along a second edge of the wheel side with the first row and the second row being spaced apart.

In another aspect, the second side, the first side 21, and the wheel side comprise walls and the one or more of the additional sides are open with the open sides facing away from the support surface when the container is in the side orientation.

In another aspect, the wheels are positioned away from the second side and the first side.

In another aspect, one of the additional sides is configured to pivot and form a door that is movable between a closed position and an open position.

In another aspect, two of the additional sides are aligned at an obtuse angle to facilitate storage of the container within a cargo hold of an aircraft.

In another aspect, one or more retraction mechanisms comprise a wheel truck that is attached to one or more of the wheels, a handle that is connected to the wheel truck and pivotable between a first position and a second position, links that operatively connect the wheel truck and the handle; and wherein with the handle in the first position the wheels are in a retracted position spaced inward from the support surface when the container is in the side orientation and with the handle in the second position the wheels are extended outward from the wheel side to contact against the support surface when the container is in the side orientation.

One aspect is directed to a container to contain a mobility device during transport on a vehicle. The container comprises an open interior space sized to receive the mobility device with the interior space bounded by a first side, a second side, a wheel side, and one or more additional sides. Wheels are connected to and extend outward from the wheel side. One or more retraction mechanisms are connected to the wheels to selectively move the wheels between a retracted position and an extended position. Wherein the retracted position locates the wheels inward from the wheel side and the extended position locates edges of the wheels outward beyond the wheel side.

In another aspect, the retraction mechanisms comprise: a wheel truck connected to two or more of the wheels; a handle movable between a first position and a second position; a plurality of links that operatively connect the wheel truck to the handle; and wherein with the handle in the first position the plurality of links are in a first pivotal alignment to position the wheels in the retracted position, and with the handle in the second position the plurality of links are in a second pivotal alignment to position the wheels in the extended position.

In another aspect, the wheels are aligned in a first row and a second row and the one or more retraction mechanisms comprise a first retraction mechanism connected to the wheels in the first row and a second retraction mechanism connected to the wheels in the second row.

In another aspect, the second side, the first side, and the first wheel side each comprise a wall configured to support the mobility device and the additional sides are wall-less to provide a visual path into the interior space.

In another aspect, the wheels are spaced away from second side and the first side.

In another aspect, the one or more retraction mechanisms comprise an over-center locking mechanism to maintain the wheels in one of the retracted position and the extended position.

In another aspect, the one or more retraction mechanisms comprise a first handle that is movable along the second side to move a first set of the wheels and a second handle that is movable along the first side to move a second set of the wheels.

In another aspect, two of the additional sides are aligned at an obtuse angle to conform to a shape of a cargo hold of an aircraft.

In another aspect, one of the additional sides is pivotable relative to the first side and forms a door that is movable between a closed position and an open position.

One aspect is directed to a method of storing a mobility device within a vehicle. The method comprises: orienting a container in an upright orientation with a first side positioned towards a support surface; loading the mobility device into an interior space of the container with the mobility device contacting against the first side; rotating the container to a side orientation and positioning a wheel side towards the support surface and the first side facing away from the support surface; rolling the container across the support surface with wheels that extend from the wheel side; and retracting the wheels while the container is in the side orientation and contacting the wheel side of the container against the support surface.

In another aspect, the method further comprises positioning the wheels away from the support surface while the container is in the upright orientation.

In another aspect, the method further comprises positioning open wheel side of the container away from the support surface when the container is in both the upright orientation and the side orientation.

In another aspect, the method further comprises securing the mobility device in the interior space prior to rotating the container to the side orientation.

The features, functions and advantages that have been discussed can be achieved independently in various aspects or may be combined in yet other aspects, further details of which can be seen with reference to the following description and the drawings.

DETAILED DESCRIPTION

Figure 1:
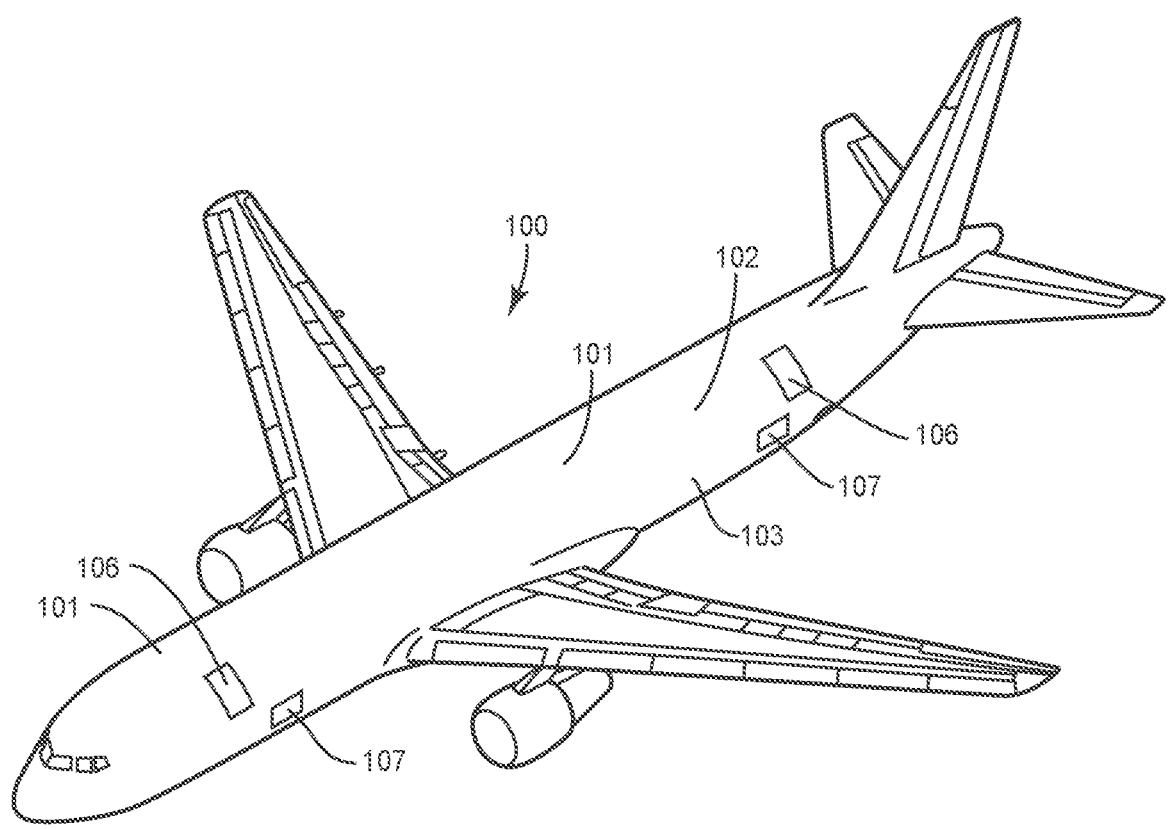
FIG. 1 is an isometric view of a vehicle configured to transport cargo.

FIG. 1 illustrates a vehicle 100 that is used to transport cargo. In this example, the vehicle 100 is an aircraft although other examples include different vehicles such as but not limited to trucks, ships, and trains. The vehicle 100 includes a fuselage 101 that is configured to hold cargo and/or passengers. In one example, the fuselage 101 is divided into a cabin area 102 configured to accommodate passengers and a cargo hold 103 configured to hold cargo. One or more doors 106 provide access to the cabin area 102 and one or more separate doors 107 provide access to the cargo hold 103.

Figure 2:
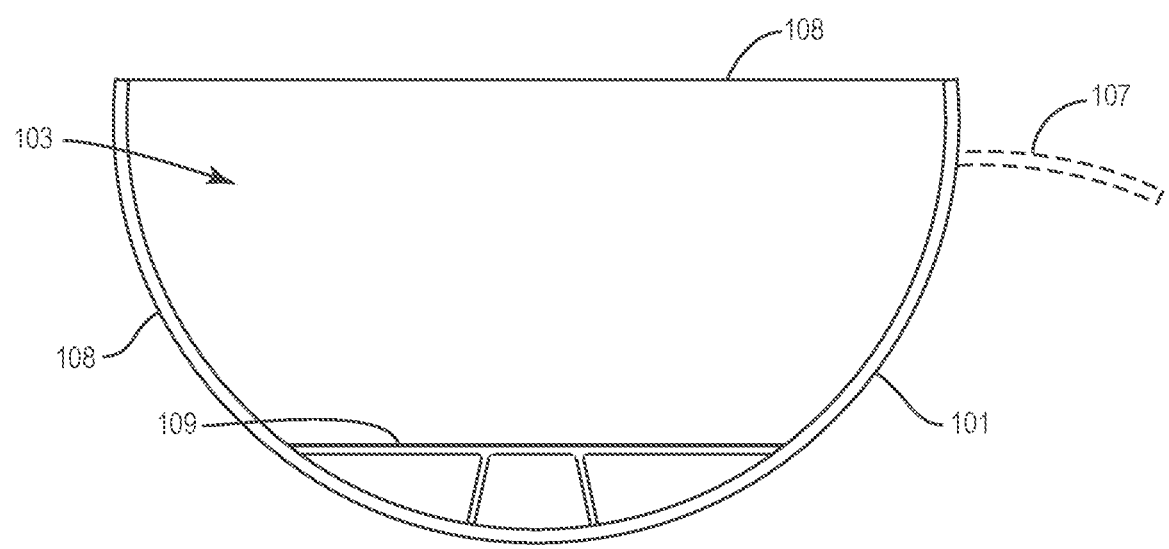
FIG. 2 is a schematic section view of a cargo hold of a vehicle.

FIG. 2 illustrates the cargo hold 103 configured to store cargo. The cargo hold 103 is enclosed within the fuselage 101. The cargo hold 103 includes outer walls 108 that include one or more of a floor, ceiling, and side walls. The walls 108 can be formed by the interior of the walls of the fuselage 101 or can be separate components that are positioned within the interior of the fuselage 101. The cargo hold 103 can include various shapes and sizes to hold a wide variety of cargo. One or more doors 107 provide access to the cargo hold 103 and are movable between a closed position during flight and an open position (shown in dashed lines) for loading and unloading the cargo.

Mobility devices 110 such as wheelchairs are stored in the cargo hold 103 during travel. This may occur for one or more reasons including that they do not fit through the door 106 and/or aisles of the cabin area 102, and regulations may require passengers to sit in vehicle seats that are designed to withstand large forces that could be experienced during the travel. The mobility devices 110 should be stored in the cargo hold 103 to prevent damage to the mobility device 110, the other cargo, and the vehicle 100.

Figure 3:
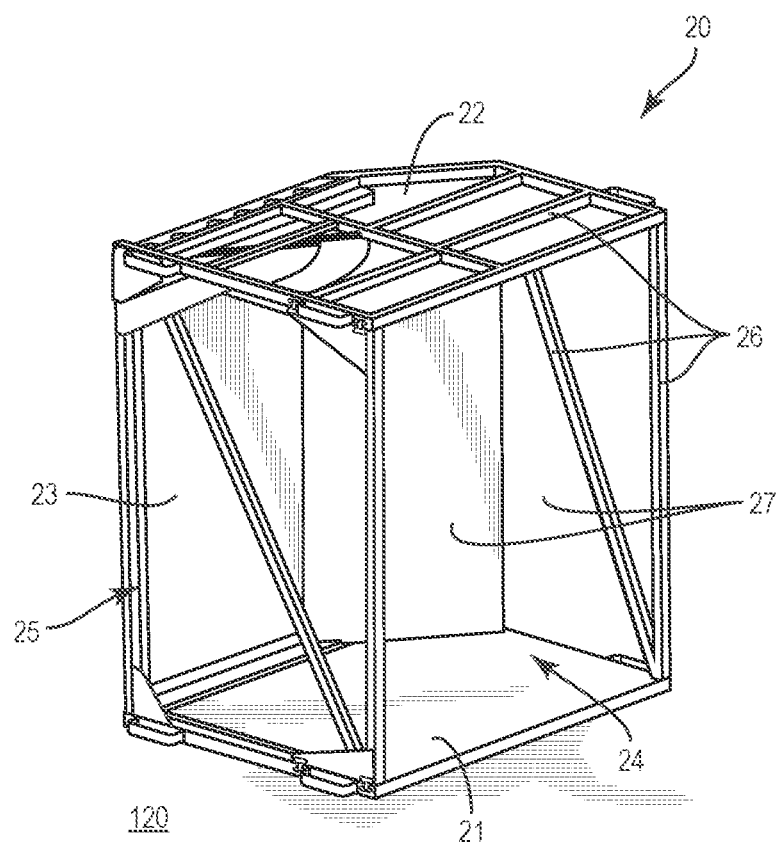
FIG. 3 is an isometric view of a container in an upright orientation and with a door in a closed position.

FIG. 3 illustrates a container 20 configured to contain a mobility device 110 during transport. The container 20 is designed to protect the mobility device 110 while stored in the cargo hold 103. The container 20 is further designed to be movable by a person that is loading and unloading the vehicle 100. For example, the container 20 may be moved through the door 107 and/or moved within the interior of the cargo hold 103. Because of this, the container 20 is designed to fit through the door 107 of the cargo hold 103 and may be shaped to conform to the relatively cramped space of the cargo hold 103.

The container 20 includes a first side 21, a second side 22, and a wheel side 23, and one or more additional sides 27. In some examples, the first side 21 faces downward and contacts a support surface 120 when the container 20 is in an upright orientation. The second side 22 is on an opposing side of the container 20 from the first side 21. The second side 22 faces away from the support surface 120 when the container 20 is in the upright orientation. The wheel side 23 and additional sides 27 extend between the first side 21 and the second side 22. In one example when the container 20 is in an upright orientation as illustrated in FIGS. 3 and 4, the first side 21 forms a bottom of the container 20, the second side 22 forms a top of the container 20, and the wheel side 23 and additional sides 27 form the lateral sides of the container 20.

An interior space 24 is formed within the sides 21, 22, 23, 27. The interior space 24 is shaped and sized to hold the mobility device 110. A door 25 is formed by one of the additional sides 27. The door 25 is movable between a closed position as illustrated in FIG. 3 to contain the mobility device 110 within the interior space 24, and an open position as illustrated in FIG. 4 for loading and unloading. In some examples, the door 25 is configured to be removed from the container 20. In use, the door 25 is removed to allow for loading the mobility device 110 into the interior space 24. Once loaded, the door 25 is attached to one or more of the sides 21, 22, 23, 27 to secure the position and enclose the interior space 24.

Figure 4:
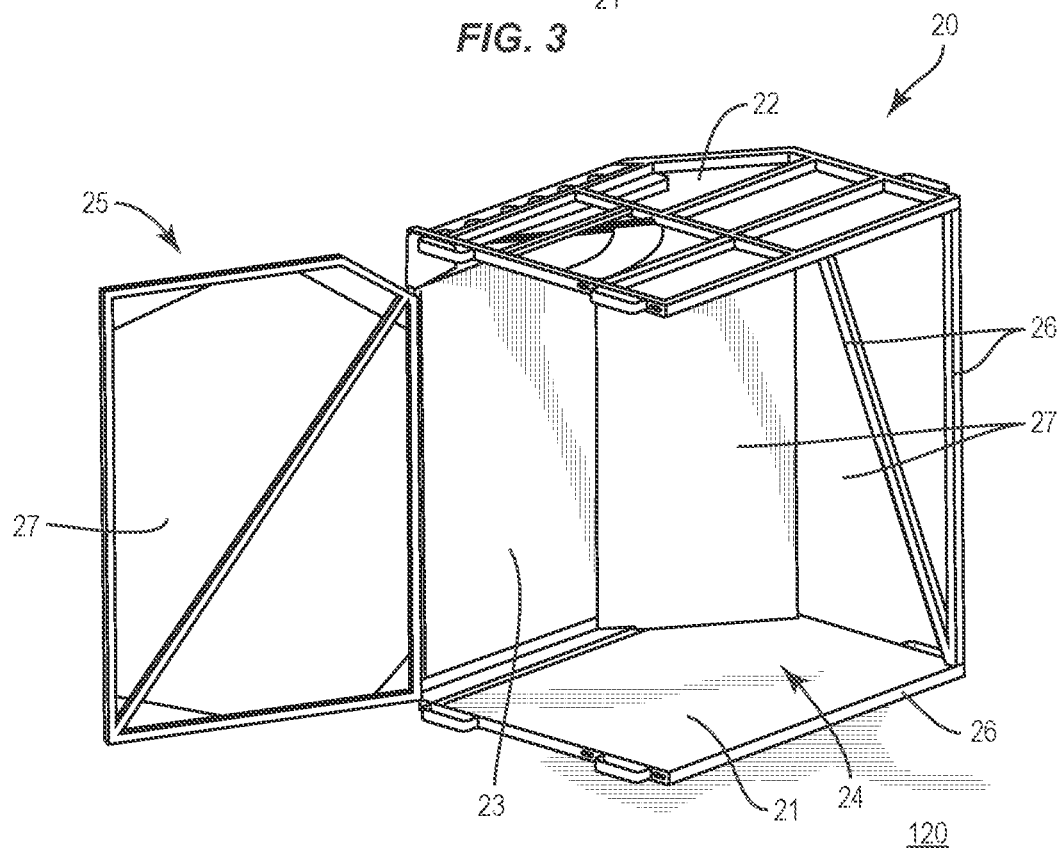
FIG. 4 is an isometric view of the container of FIG. 3 with the door in an open position.
Figure 5A:
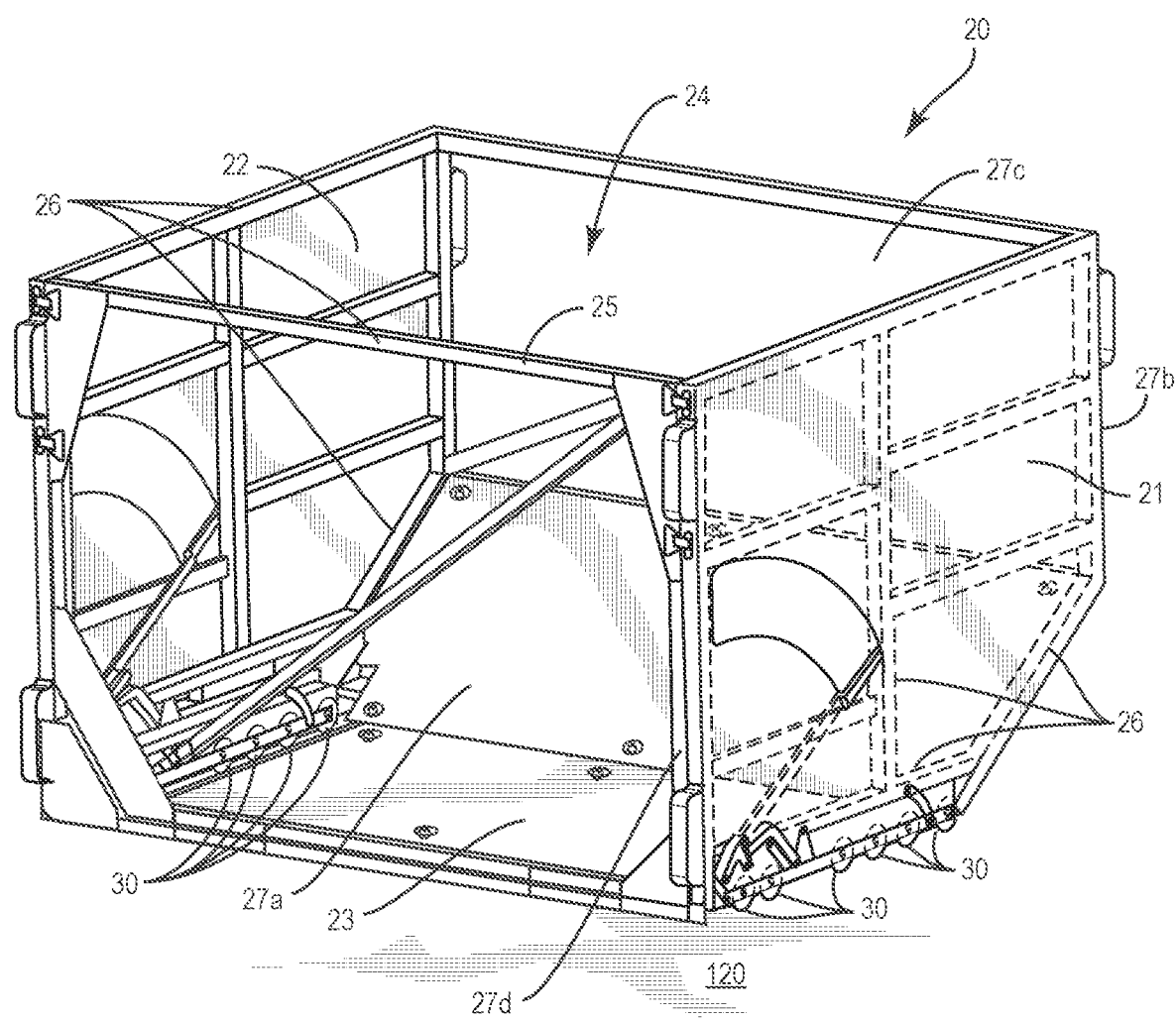
FIG. 5A is an isometric view of a container in a side orientation.
Figure 5B:
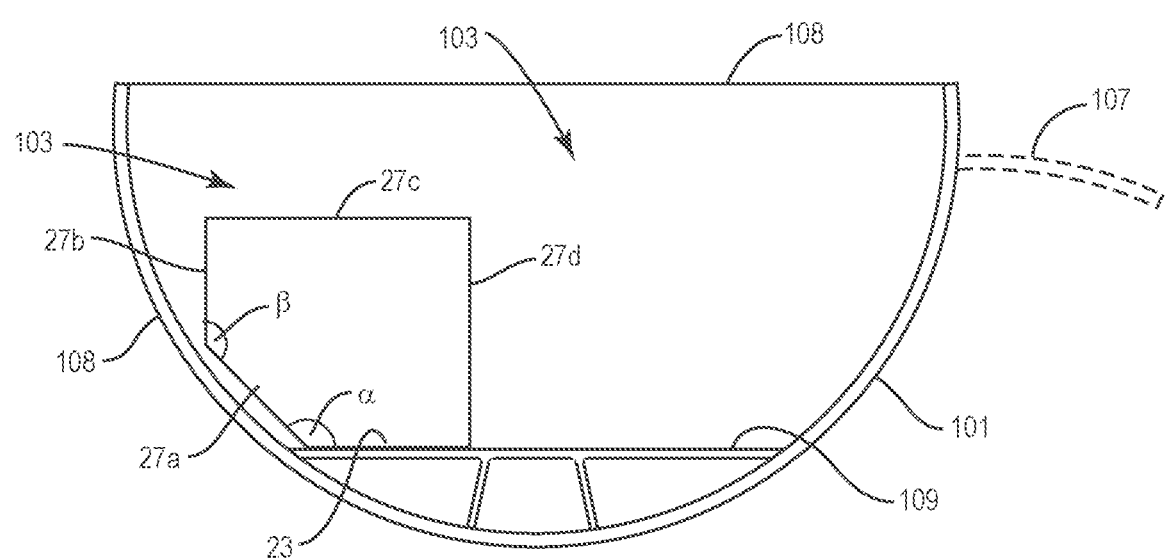
FIG. 5B is a schematic side view of the container of FIG. 5A positioned in the cargo hold.

The container 20 is configured to be oriented in an upright orientation as illustrated in FIGS. 3 and 4 and on its side as illustrated in FIGS. 5A and 5B. In the side orientation, the wheel side 23 faces downward towards the support surface 120. This orientation provides for loading the container 20 through the door 107 and/or storing the container 20 in the cargo hold 103.

In some examples, one or more of the sides 21, 22, 23, 27 include a wall. In one example, the wall is formed by a sheet of material. In another example, the wall is formed by one or more frame members 26 that support a sheet. In some examples, the wall is continuous such that there are no openings. The one or more walls can be configured to support the mobility device 110 in the upright orientation and the side orientation. In some examples as illustrated in FIGS. 3 and 4, walls extend along the first side 21, second side 22, and wheel side 23. The number of walls in the container 20 can vary.

In some examples, one or more of the additional sides 27 is open (i.e., wall-less). The open sides provide for viewing the interior space 24. In some examples, the one or more open sides are not configured to support other cargo. This may be because there is not adequate structural members for the support and/or a person loading the vehicle 100 can view into the interior space 24 and realize that other cargo should not be stored on these open sides of the container 20. This prevents the mobility device 110 from being damaged. The open sides can also facilitate securing the mobility device 110 within the interior space 24. In some examples, a person can reach into the interior space 24 through the open sides and attach straps to the mobility device 110 to secure the position. In some examples, the open sides include one or more support members that provide attachment points for the straps. One or more of the open sides can be covered to protect the mobility device 110 from the weather or debris. The cover includes fabric or is constructed to be flexible to conform to the shape of the container 20. The covers can be opaque or transparent.

In some examples, each of the sides 21, 22, 23, 27 are closed (i.e., are walled). The walled sides completely enclose the interior space 24 and protect the mobility device 110.

In some examples as illustrated in FIGS. 3, 4, 5A, and 5B, each of the sides 21, 22, 23, 27 are flat. This facilitates loading and storing the container 20 on a flat floor of the cargo hold 103. In other examples, one or more of these sides has a curved or uneven shape.

In some examples, the container 20 is shaped to conform to the shape of the cargo hold 103. As best illustrated in FIGS. 5A and 5B, the shape conforms to the substantially rounded shape of the cargo hold 103. Sides 23 and 27a are aligned at an obtuse angle α and sides 27a and 27b are aligned at an obtuse angle β. When the container 20 is positioned in the cargo hold 103 with the side 23 on the floor 109, the shape provides for sides 27a and 27b to substantially conform to the shape of the outer wall 108 and increase the efficiency of space usage of cargo within the cargo hold 103. In some examples, side 27d is perpendicular to both side 23 and side 27c. This provides for side 27d to be perpendicular to the floor 109 of the cargo hold 103. This can provide for abutting other cargo against the side 27d and increase space efficiency.

Figure 6:
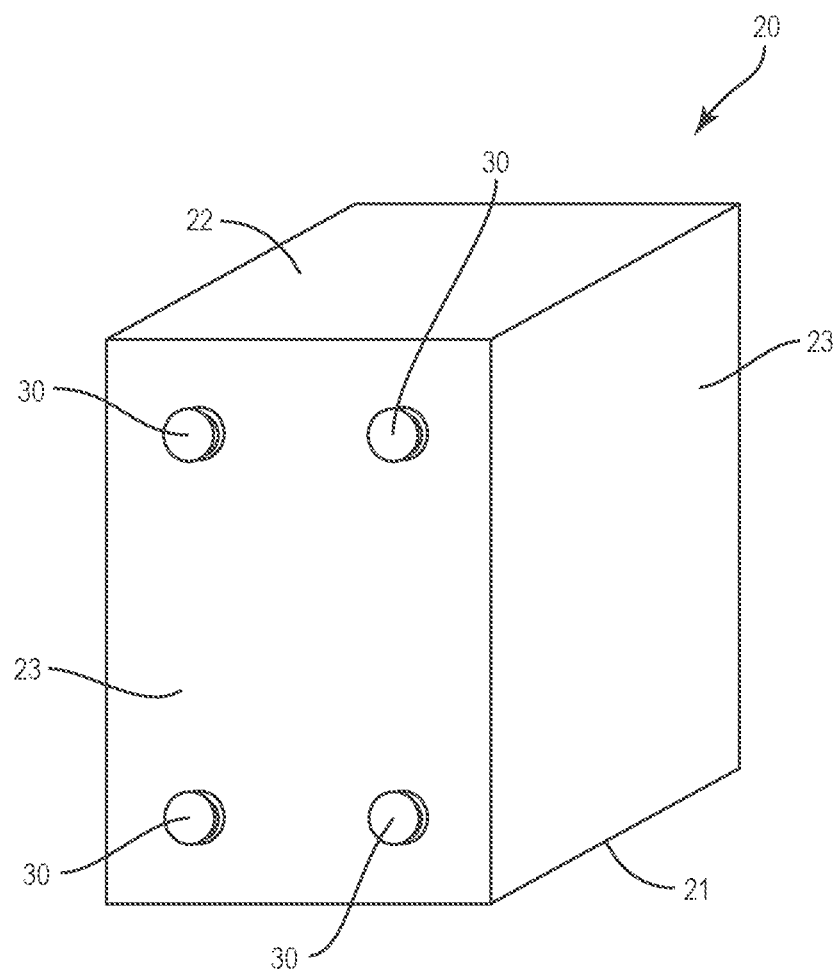
FIG. 6 is a schematic view of a container in an upright orientation and with wheels positioned on a wheel side.

As illustrated in FIG. 6, the container 20 includes wheels 30 to provide for movement during loading and unloading. The term "wheels" is used to broadly define a variety of different mechanical structures that provide for movement including but not limited to wheels, tracks, treads, omni wheels, and castor wheels. In some examples as illustrated in FIG. 6, the wheels 30 are positioned on one side 23. In other examples, the wheels 30 are positioned on the wheel side 23 and one or more of the additional sides 27.

In some examples, the wheels 30 are each flat and secured in a fixed orientation. This configuration provides for the container 20 to be moved in two directions (e.g., forward and backward). In other examples, the wheels 30 are pivotally attached to the container 20 to provide for movement in multiple different directions.

In some examples, the wheels 30 are movable between an extended position and a retracted position. In the extended position, the wheels 30 are positioned to contact against the support surface 120 and provide for moving the container 20. In the retracted position, the wheels 30 are moved inward such that the wheel side 23 contacts against the support surface and prevents the container 20 from moving. In one example, the wheels 30 are deployed to position the container 20 within the cargo hold 103 and are retracted once positioned in the cargo hold 103. In some examples, the wheels 30 are retracted during portions of the loading, such as when being moved up an inclined conveyor ramp that extends from the ground and into the cargo hold 103. This retracted position provides for the container 20 to remain at a static position relative to the conveyor and prevents rolling down the conveyor.

FIG. 5A illustrates a container 20 with two rows of wheels 30 positioned along the wheel side 23. The rows of wheels 30 are spaced apart on opposing edges of the wheel side 23 to support the container 20 above the support surface 120. A first row of wheels 30 is positioned in proximity to the corner formed by the wheel side 23 and the first side 21. A second row of wheels 30 is positioned in proximity to the corner formed by the wheel side 23 and the second side 22.

Figure 7:
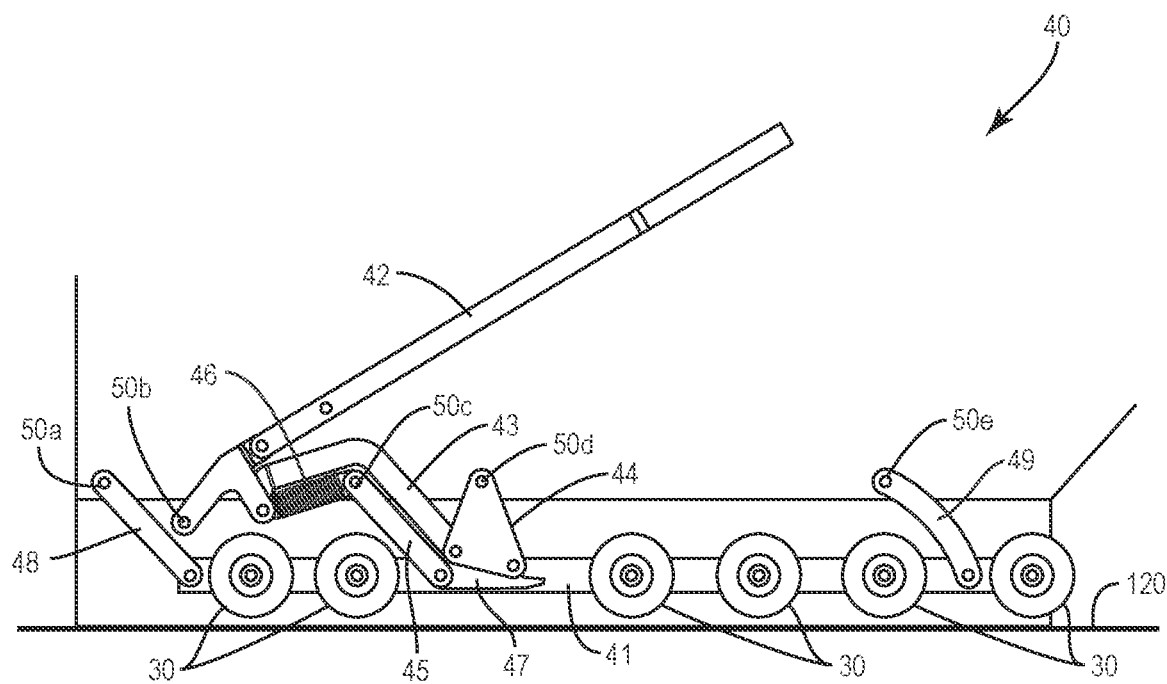
FIG. 7 is a side schematic diagram of wheels connected to a retraction mechanism in a retracted position.
Figure 8:
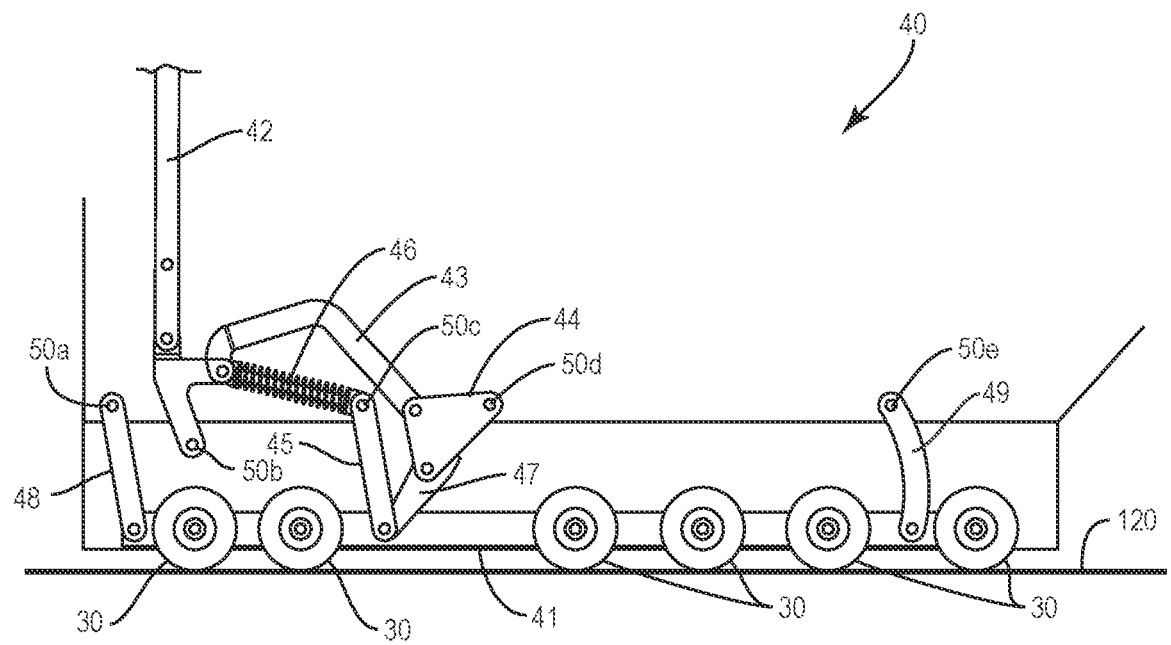
FIG. 8 is a side schematic diagram of the wheels and retraction mechanism of FIG. 7 in an extended position.

FIGS. 7 and 8 illustrate a retraction mechanism 40 that provides for moving the wheels 30 between extended and retracted positions. The wheels 30 are mounted on an elongated wheel truck 41. In one example, the wheel truck 41 is straight and aligns the wheels 30 in a straight line.

The retraction mechanism 40 further includes a handle 42 that is operatively connected to the wheel truck 41 through a handle link 43, an upper lock link 44, link 45, lower lock link 47, and a spring 46. In some examples, the spring 46 extends around an elongated member that extends between the link 45 and the handle 42. Connector links 48, 49 are connected to the wheel truck 41.

The retraction mechanism 40 is mounted to the container 20 at pivots 50. The pivots 50 include mechanical fasteners such as but not limited to rivets, bolts, and clips that provide for pivoting movement between the connected members. The pivots 50 connect the retraction mechanism 40 to the container 20 and are fixed in position relative to the container 20 during movement between the extended and retracted positions. In one example, pivots 50 include pivot member 50a on the connector link 48, pivot member 50b on the handle 42, pivot member 50c on the link 45, pivot member 50d on the upper lock link 44, and pivot member 50e on the connector link 49. In some examples, the pivots 50 are connected to one or more frame members 26 and solid sides of the container 20 (see FIG. 5A).

FIG. 7 illustrates the retraction mechanism 40 in the retracted position. The handle 42 is pivoted downward towards the wheel truck 41. In this retracted position, the wheels 30 are pulled upward above the wheel side 23 of the container 20 that contacts against the support surface 120. This causes the wheel side 23 of the container 20 to contact the support surface 120 and restricts movement of the container 20 relative to the support surface 120. In one example the spring 46 applies a force that holds the handle 42 in the retracted position.

FIG. 8 illustrates the retraction mechanism in the extended position. The handle 42 is pivoted away from the wheel truck 41. This pivoting movement forces the wheel truck 41 downward such and positions the wheels 30 outward beyond the wheel side 23 of the container 20. This position provides for the wheels 30 to contact the support surface 120 to allow movement of the container 20 relative to the support surface 120. In one example, the spring 46 applies a force that holds the handle 42 in the extended position. In one example, the upper lock link 44 and the lower lock link 47 are held over center by the handle link 43 and spring force. The upper lock link 44 and lower lock link 47 create a fixed triangle that holds the wheels 30 in the extended position.

In another example, the wheels 30 are individually mounted to the wheel side 23. In some examples, the wheels 30 are mounted to provide for pivoting movement to facilitate movement of the container 20 in different directions along the support surface 120.

Figure 9:
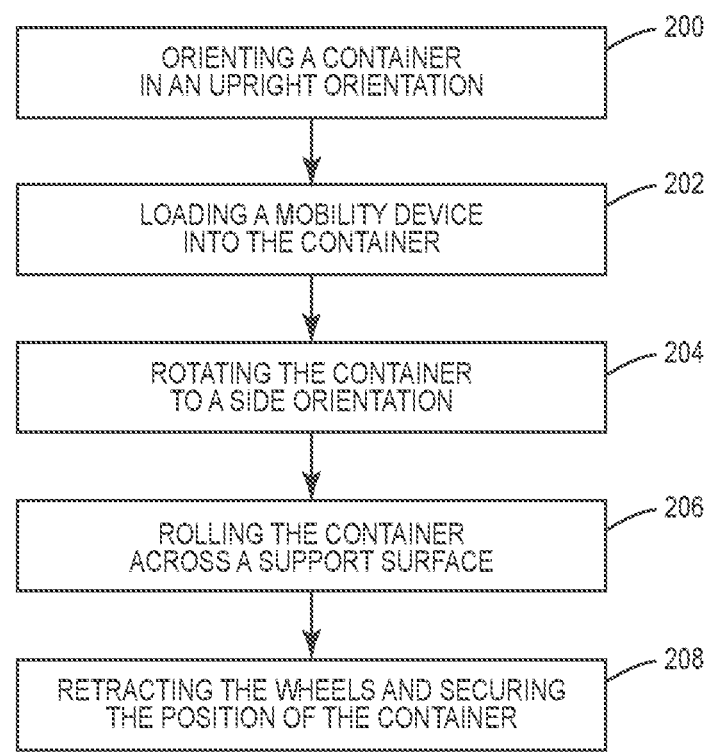
FIG. 9 is a flowchart diagram of a method of storing a mobility device within a vehicle.

FIG. 9 illustrates a method of storing a mobility device 110 within a vehicle 100. The method includes orienting a container 20 in an upright orientation with a first side 21 positioned towards a support surface 120 (block 200). The mobility device 110 is loaded into an interior space 24 of the container 20 with the mobility device 110 contacting against the first side 21 (block 202). In the upright orientation, the first side 21 contacts against the support surface 120. The container 20 is rotated to a side orientation that positions a wheel side 23 towards the support surface 120 and the first side 21 facing away from the support surface 120 (block 204). The container 20 is rolled across the support surface 120 with wheels 30 that extend from the wheel side 23 (block 206). Once the container 20 is located at a desired position, the wheels 30 are retracted while the container 20 is in the side orientation and the wheel side 23 is contacted against the support surface 120 (block 208).

In some examples, the container 20 is stored in a side orientation with a wheel side 23 contacting against the support surface 120 during transport. In other examples, the container 20 is stored in an upright orientation with the first side 21 contacting against the support surface 120 during transport.

A wheelchair is one example of a mobility device 110. Other examples include but are not limited to scooters and carts.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A container to contain a mobility device during transport on a vehicle, the container comprising:
a frame that extends around an interior space with the interior space sized to contain the mobility device, the frame comprising:
a first side, a second side, a door side, a wheel side, and at least one additional side;
the door side and the wheel side share a common edge;
the door side, the wheel side, and the at least one additional side extend between the first and second side;
the at least one additional side shares an edge with the wheel side and forms an obtuse angle with the wheel side;
a door pivotally connected to the frame along a pivot at the common edge, the door positionable between an open position and a closed position;
retractable wheels connected to the wheel side of the frame with the wheels positioned away from the door;
wherein the container is selectively positionable between an upright orientation and a side orientation;
wherein the upright orientation comprises the door in an upright orientation with the pivot edge having a vertical orientation, the wheels positioned away from a support surface, and the first side on the support surface;
wherein the side orientation comprises the wheels positioned downward on the support surface and door positioned away from the support surface and the pivot edge having a horizontal orientation; and
wherein the door is configured to be open in the upright orientation for loading the mobility device and closed in the side orientation.

2. The container of claim 1, wherein the wheels are aligned in a first row that extends along a first edge of the wheel side and a second row that extends along a second edge of the wheel side with the first row and the second row being spaced apart.

3. The container of claim 1, wherein the wheel side comprises a wall and one or more of the additional sides of the frame are open and that face away from the support surface when the container is in the side orientation.

4. The container of claim 1, further comprising one or more retraction mechanisms comprising:
a wheel truck that is attached to one or more of the wheels;
a handle that is connected to the wheel truck and pivotable between a first position and a second position;
links that operatively connect the wheel truck and the handle;
wherein with the handle in the first position, the wheels are in a retracted position spaced inward from the support surface when the container is in the side orientation; and
wherein with the handle in the second position, the wheels are extended outward from the wheel side to contact against the support surface when the container is in the side orientation.

5. A container to contain a mobility device during transport on a vehicle, the container comprising:
a frame comprising a plurality of frame members that extend along and form a plurality of sides, wherein the plurality of sides comprises a door side, a wheel side, an adjacent side that shares an edge with the door side with the edge being open without one of the frame members;
a door comprising an outer frame and having a shape and size that corresponds to the door side of the frame, the door selectively movable between a closed position within the door side and an open position that is away from the door side;

an open interior space formed within the frame and sized to receive the mobility device;

wheels connected to and that extend outward from the wheel side;

one or more retraction mechanisms connected to the wheels to selectively move the wheels between a retracted position and an extended position;

wherein the retracted position locates the wheels inward from the wheel side and the extended position locates edges of the wheels outward beyond the wheel side; and wherein a section of the outer frame of the door is positioned along the edge between the door side and the adjacent side of the frame when the door is in the closed position.

6. The container of claim 5, wherein the retraction mechanisms comprise:

a wheel truck connected to two or more of the wheels;

a handle movable between a first position and a second position;

a plurality of links that operatively connect the wheel truck to the handle; and wherein with the handle in the first position the plurality of links are in a first pivotal alignment to locate the wheels in the retracted position, and with the handle in the second position the plurality of links are in a second pivotal alignment to locate the wheels in the extended position.

7. The container of claim 5, wherein the wheels are aligned in a first row and a second row and the one or more retraction mechanisms comprise a first retraction mechanism connected to the wheels in the first row and a second retraction mechanism connected to the wheels in the second row.

8. The container of claim 5, wherein the wheels are located away from the door side of the frame.

9. The container of claim 5, wherein the one or more retraction mechanisms comprise an over-center locking mechanism to maintain the wheels in one of the retracted position and the extended position.

10. The container of claim 5, wherein the one or more retraction mechanisms comprise a first handle that is movable along the second side to move a first set of the wheels and a second handle that is movable along the first side to move a second set of the wheels.

11. The container of claim 5, wherein the wheel side and one of the additional sides are aligned at an obtuse angle to conform to a shape of a cargo hold of an aircraft.

12. The container of claim 1, wherein the door comprises an outer frame.

13. The container of claim 1, wherein the door is configured to be removed from the frame.

14. The container of claim 1, further comprising a wall formed by a sheet of material and is sized to extend across one of the sides of the frame.

15. The container of claim 14, wherein the wall is continuous with no openings.

16. The container of claim 14, further comprising walls that extend along the wheel side and one of the additional sides, the walls formed by sheets of material.

17. The container of claim 5, wherein the plurality of sides are flat.

18. The container of claim 5, wherein the wheels are positioned along a single one of the plurality of sides.

* * * * *